(12) United States Patent
Venkatesha et al.

(10) Patent No.: US 6,802,921 B1
(45) Date of Patent: Oct. 12, 2004

(54) PROCESS AND SYSTEM FOR VITRIFIED EXTRUDED CERAMIC TILES AND PROFILES

(75) Inventors: Rudrapatnakeshavamurthy Venkatesha, Chennai (IN); Snehasish Ghosh, Chennai (IN); Kasturi Umapathy Rao, Chennai (IN)

(73) Assignee: Boss Profiles Limited, Chennai (IN)

( * ) Notice: Subject to any disclaimer, the term of this patent is extended or adjusted under 35 U.S.C. 154(b) by 0 days.

(21) Appl. No.: 10/240,059

(22) PCT Filed: Mar. 29, 2000

(86) PCT No.: PCT/IN00/00035

§ 371 (c)(1),
(2), (4) Date: Feb. 11, 2003

(87) PCT Pub. No.: WO01/72490

PCT Pub. Date: Oct. 4, 2001

(51) Int. Cl.[7] .......................... B28C 1/00; B28B 17/02; B28B 3/20; B28B 15/00
(52) U.S. Cl. .................. 156/89.11; 156/63; 156/89.24; 156/244.11; 156/266; 156/500; 156/517; 264/609; 264/638; 264/652; 264/680; 425/90; 425/202; 425/461
(58) Field of Search .................. 156/63, 89.11, 156/89.23, 89.24, 244.11, 266, 500, 499, 517; 264/609, 638, 652, 679, 680, 678; 425/202, 3, 90, 461

(56) References Cited

U.S. PATENT DOCUMENTS

| | | | | |
|---|---|---|---|---|
| 3,628,989 A | * | 12/1971 | Solmi | 428/325 |
| 4,157,408 A | * | 6/1979 | Lingl | 427/209 |
| 4,351,788 A | * | 9/1982 | Schreurs | 264/639 |
| 5,174,818 A | * | 12/1992 | Symons | 106/686 |
| 5,190,708 A | * | 3/1993 | Vitaliano et al. | 427/376.2 |
| 5,568,391 A | * | 10/1996 | Mckee | 700/122 |
| 5,695,712 A | * | 12/1997 | Kumar et al. | 264/655 |
| 5,928,728 A | * | 7/1999 | Takagi et al. | 427/376.2 |

FOREIGN PATENT DOCUMENTS

| | | | |
|---|---|---|---|
| DE | 2 051 466 | * | 4/1971 |
| DE | 20 51 466 | | 4/1971 |
| DE | 35 35 590 | * | 4/1987 |
| EP | 0 023 747 | * | 6/1983 |
| FR | 1 144 188 | | 10/1957 |
| FR | 2 236 354 | | 1/1975 |
| FR | 2 236 354 | * | 3/1975 |
| JP | 63-222059 | * | 9/1988 |

OTHER PUBLICATIONS

Patent Abstracts of Japan, vol. 1998, No. 13, Nov. 30, 1998 (abstract).

(List continued on next page.)

Primary Examiner—Melvin C. Mayes
(74) Attorney, Agent, or Firm—Harrison & Egbert

(57) ABSTRACT

A novel process for manufacturing fully vitrified flat extruded ceramic glazed, unglazed tiles and profiles includes the following steps: mixing of raw materials in predetermined ratios; wet milling in ball mills; mechanical filter pressing to get cakes; shredding of cake to obtain noodles like structure; using a de-airing pug mill machine to produce proper mixing by removing of air the body; drawing a column of clay body through a die for required shapes; drying in three layer horizontal drier and chamber drier; coloring in a appropriate glazing line; firing in a appropriate roller kiln; sorting line; packing and palletizing machine; and using a sawing and glueing machine for smaller size tiles to make patterns and for border tiles. The invention also includes a system for carrying out the invented process so as to achieve high quality fully vitrified ceramic tiles and profiles.

13 Claims, 5 Drawing Sheets

OTHER PUBLICATIONS

H. Reh, "Steps in the Development of floor Tile Technology" Ceramic Engineering and Science Proceedings, vol. 12, No. 1/2, Jan. 1991, pp. 1–12.

K. Schmidt "Vollautomatisierete Fertigungslinie zur Herstellung von Zwishenprudukten aus schwer verziehbaren keramischen Massen" Sprechsall, vo. 114, No. 12, Dec. 1981, pp. 910–915.

W. Schlegel "Forschritte zur Automatisierung der Herstellung keramisher Platten" Keramische Zeitschrift, vol. 9, No. 10, Octo. 1957 pp. 526,529.

* cited by examiner

PROCESS AND SYSTEM FOR VITRIFIED EXTRUDED CERAMIC TILES AND PROFILES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The various aspects for novel technology, a novel process of manufacturing tiles of various shapes and profiles and the novel system for manufacturing tiles are compared in the ensuing description with respective conventional processes and system known in the art. There are various methods in process of manufacturing known in the art. This specification traces the various aspects of the prior art methods, evaluation of technology, merits and demerits of various methods and processes.

BACKGROUND OF THE INVENTION

Inherent problems associated with prior art tiles are as listed below:

1. Dust Attraction by tile surface
2. Rough Surface
3. Staining of tiles

Density

It is primary object of the invention to invent novel ceramic tiles and profiles which overcome the problems by creating molecular surface configuration instead of granular surface. Attraction of dust is due to pores and rough on the surface between granules. Because of molecular configuration there will not be any pores the surface of the tiles. This is achieved by milling the clay to a very fine quality and as consequence filter pressing the body are prevented from entering the tiles as there are either no pores or only micro pores which will not allow the dust to enter into tiles.

The prior art tiles have a rough surface. By having a smooth surface, the tiles are easy to clean and easy to maintain. This is one salient feature of the invention. Conventional tiles tend to stain. In this novel invented process of manufacturing tiles, the tiles so produced do not have pores or have only micro pores and this feature makes the tiles resistant to stain.

Low density of the prior art tiles result in low strength tiles. This is due to high absorption of water. Hence the novel process, by controlling the water content, produces tiles having high density and high compression strength.

The salient features of the conventional process are illustrated in FIG. 2 of the drawing.

First of the conventional process is based on hydraulic technology. The flow diagrams of the conventional process and novel process are described herein.

In the said process, raw material is either subjected to the process of grinding in ball mills, followed by storing in vats, and subsequently spray drying the material and forming to shape by hydraulic press. As an alternative the raw material is mixed with water and subjecting the mix to hydraulic process.

Further subject the material to a series of conventional operation in order to obtain ceramic products, the said sequence being described herein.

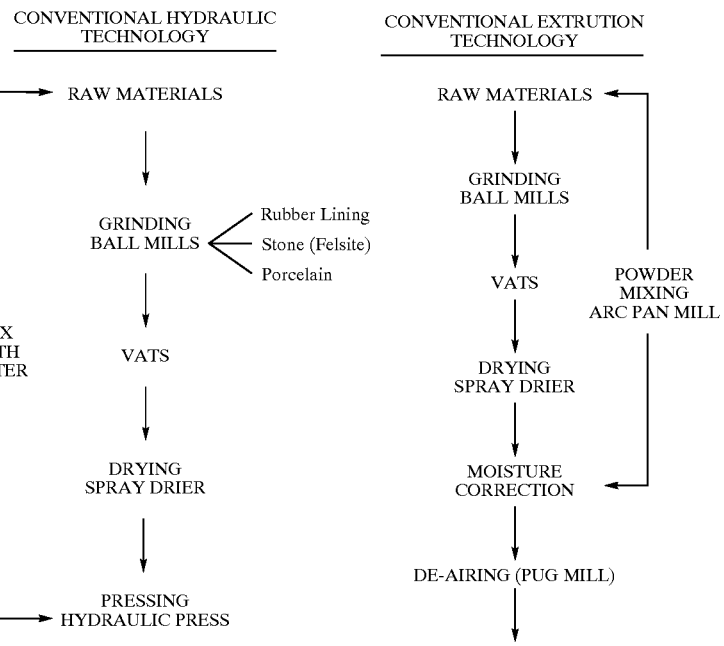

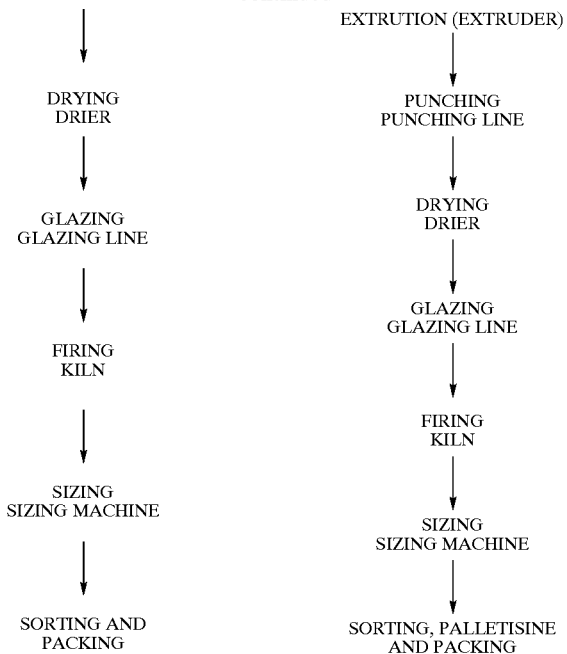

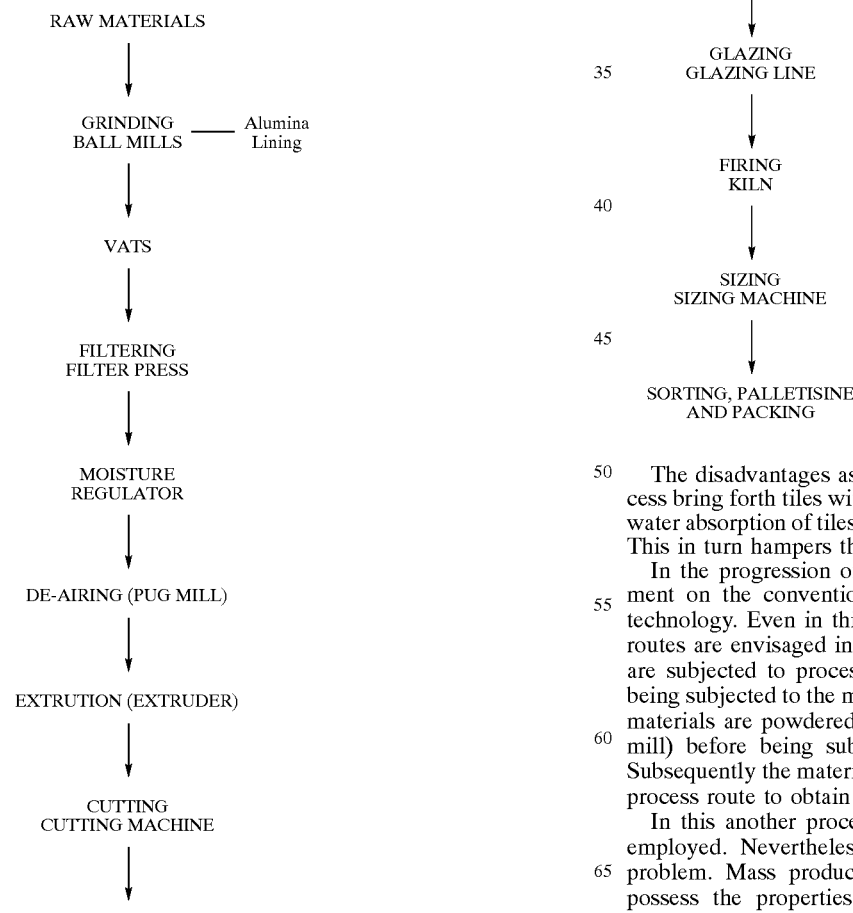

The disadvantages associated with the conventional process bring forth tiles with poor quality in many respects viz, water absorption of tiles is very high leading to low strength. This in turn hampers the life of tiles.

In the progression of the technology the next improvement on the conventional process is based on extrusion technology. Even in this technology process, two different routes are envisaged in manufacturing tiles. Raw materials are subjected to process of grinding, spray drying before being subjected to the moisture correction as alternative raw materials are powdered in a powder mixing Arc mill (pan mill) before being subjected to the moisture correction. Subsequently the material is subjected to other conventional process route to obtain tiles.

In this another process shows in a better technology is employed. Nevertheless, controlling the parameters is a problem. Mass production of tiles is difficult. The tiles possess the properties of low absorption of water and moderate strength.

Novel process according to the invention overcome the problem associated with prior art. The invented process yield better tiles in terms of quality. That is to say that tiles possess low water absorption and high strength apart from various other physical and chemical characteristics which are enumerated in the ensuing description.

It is primary object of the invention to invent a novel process for manufacturing fully vitrified flat extruded ceramic glazed and unglazed tiles, shapes and profiles.

It is another object of the invention to invent novel ceramic tiles which possess good dimensional stability, rustic surface appearance and have no drain marks caused by glazing process.

It is another object of the invention to invent novel ceramic tiles which can be easily produced and can be of any profile and shape.

Further objects of the invention will be apparent from the ensuing description.

BRIEF SUMMARY OF THE INVENTION

This invention relates to improved process of manufacturing unglazed and glazed ceramic extruded tile starting from, the raw materials, mainly washed clay, feldspar, quartz and talc in a pre-determined ratio, the said process comprises the steps wherein the raw material being loaded into the ball mills, water being charged into the ball mill to facilitate wet mixing wherein the raw materials and water are in the ratio of 60:40, grinding the batch of raw materials with water in the mill so as to form into a thick slurry/slip, the slip being transferred to a vibroscreen wherein all the impurities being removed and then the slurry passes through a magnetic separator for removal of all iron content. The cleaned slurry pumped through a filter press and the filter cake passes through cake shredder wherein the cake is broken into noodles, and noodles are taken to a de-airing pug mill wherein air bubbles of the shrouded noodles are removed. The water being added when required; the shrouded noodles are sent to extruder and extruded to pre-determined shape and thickness of tiles/pieces. The continuous ceramic column cut into the required size and the strain free pieces/tiles, will move into a Three Layer Horizontal Drier/chamber drier where the moisture in the tiles/pieces are removed. The drier is heated with the natural gas/propane at a maximum temperature-200 to 300 degree C. The dried tiles/pieces will be either glazed on the glazing line or unglazed will move further into the Roller Kiln (fired by natural gas/propane) operating at a temperature of 1200–1230 degree C. where the tiles/pieces are fired before being sorted.

The tiles so far known in the art have an inherent limitations by virtue of the manufacturing process wherein the process comprises producing spray dried ceramic body granules pressed together to form a tile. Once the file is fired, the gap between the granules create micro pores. These micro pores attract dust and stain. To obviate this problem, a novel process of manufacturing tiles is invented.

The basic idea behind this technology is to have more interlocking structure between raw materials particles in comparison to the conventional spray dried/pressed technology.

In the conventional process the globular grains are having air pockets within then which are when pressed remain as micropores within the tile body which when fired leads to comparatively higher amount of porosity. But in the novel process the interlocking of grains is achieved by compressing and dewatering the slip in filter press. This inherent interlocking of grains itself gives low porosity leading to lower fired porosity and higher strength and very fine surface quality. This is one of the essential features of our invention.

This invention also comprises a system for the manufacturing of extruded ceramic tiles of any shape by normal process and the configuration is comprised of:

a. plurality of Ball mills for grinding raw material to required specification wherein the raw material are fed into the Ball Mill through conveyer and weighing hopper along with binder and water to get the slurry.

b. a magnetic separator connected to ball mill where the iron particles contained in slurry gets separated.

c. plurality of vats wherein the slurry is in constant movement to prevent sedimentation in slurry, the said vats are connected to ball mill.

d. a pair of mechanical filter press to obtain a filter cake of clay body, the mechanical filter presses are connected to vat.

e. a pair of moisture regulator and cake shredder for shredding the filter cake to required noodle like shape, the said shredder connected to filter press.

f. a pair of de-airing pug mill removes air bubbles by evacuation which improves the workability/plasticity of clay, the said de-airing pug mill connected to cake shredder.

g. the said extruder having a pair of mouthpiece/die to enable to draw a clay body column, the said extruder connected to de-airing pug mill.

h. a pair of cutting machine being connected to extruder, the clay column is then cut into a required sizes by punching system, the said machine is connected to extruder.

i. a three layer horizontal drier being used for flat products drying with constant density, the said drier being connected to electronic cutting machine.

j. a chamber drier being used for shapes and profiles product drying, the said drier being connected to universal cutting machine.

k. a pair of glazing line is incorporated for glazing flat tiles and different kind of shapes and profiles, and a conveying line being connected to kiln for unglazed tiles, the said machine is connected to drier.

l. a pair of single layer fast roller kiln for firing the glazed and unglazed tiles, shapes and profiles, the said roller kiln is connected to glazing line and conveying line.

m. a squaring and chamfering machine to get a rectangularity of tiles, with side adjustment and feather machine is used to clean the sides of shapes and profiles, the said squaring machine is connected to roller kiln.

n. a liner and a planner device being connected to a sorting conveyor for checking the dimensional defects and planarity of the tiles.

o. an automatic sorting line being connected to squaring and chamfering machine for selection of finished tiles for palletizing and p. an endless saw machine with semi-automatic gluing machine for border tiles and square pieces for design floors.

DETAILED DESCRIPTION OF THE INVENTION

Raw Materials

Figure 1:
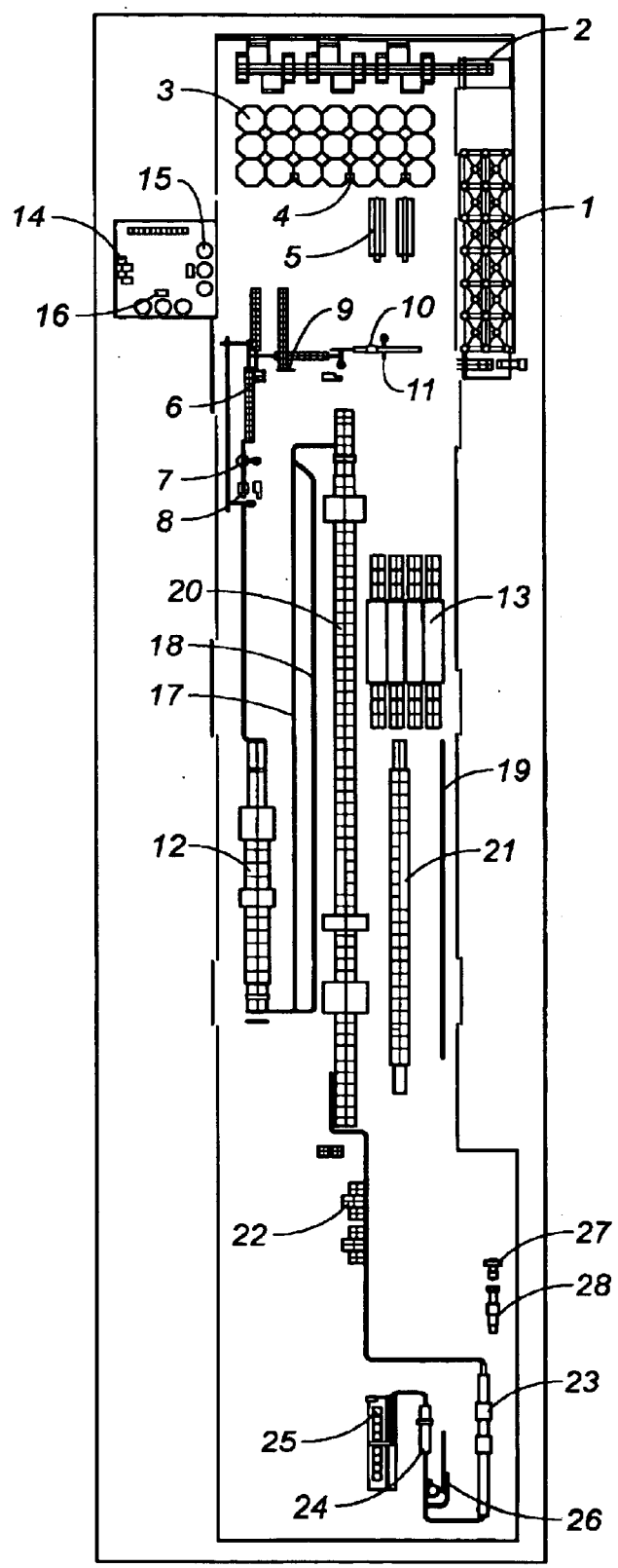
FIG. 1 is a schematic view showing the entire system line to produce flat tiles, shapes and profiles.
Figure 2:
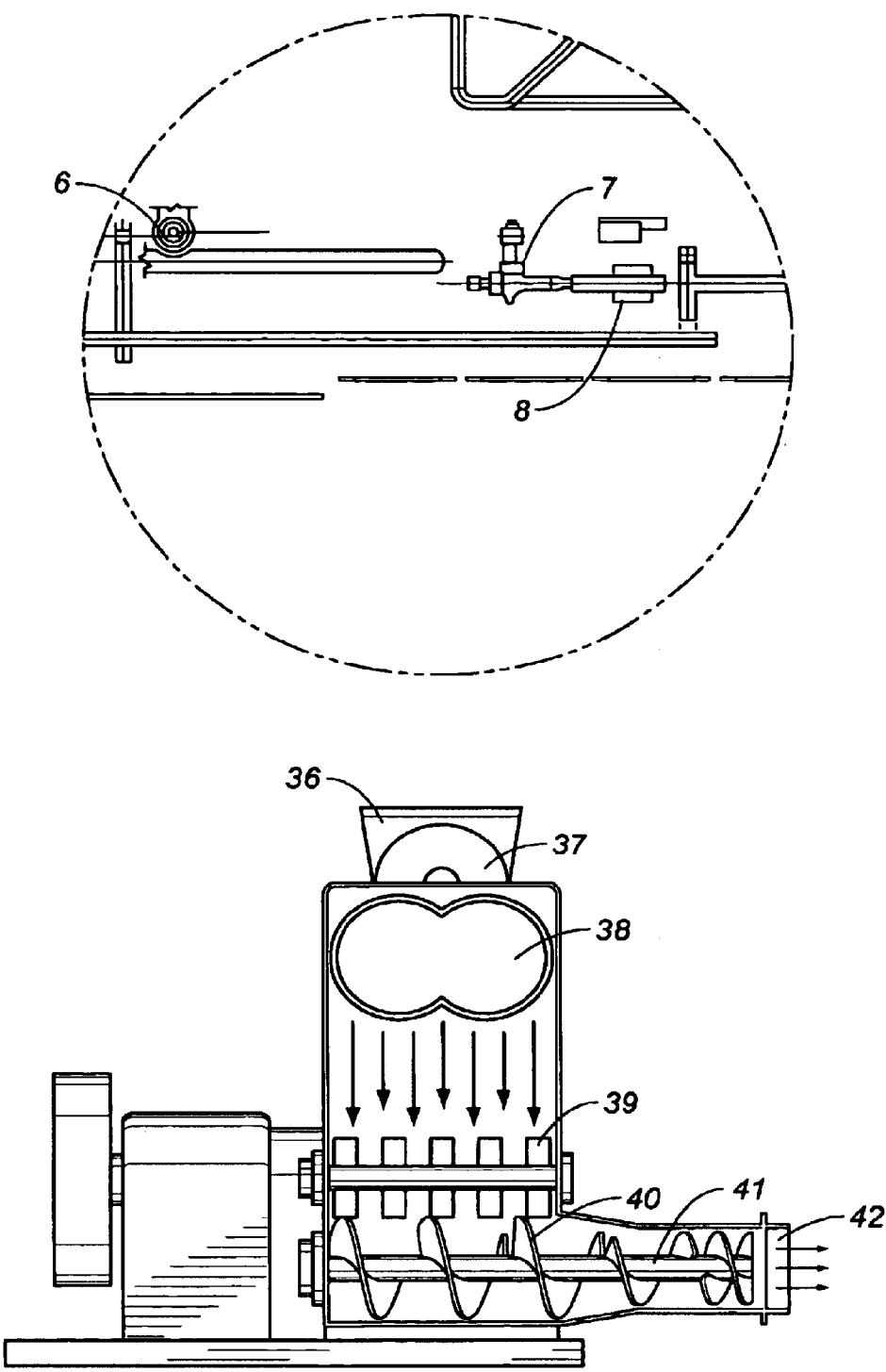
FIG. 2 shows a sectional view and a close-up detailed view of the mechanical filter press to produce filter cakes.
Figure 3:
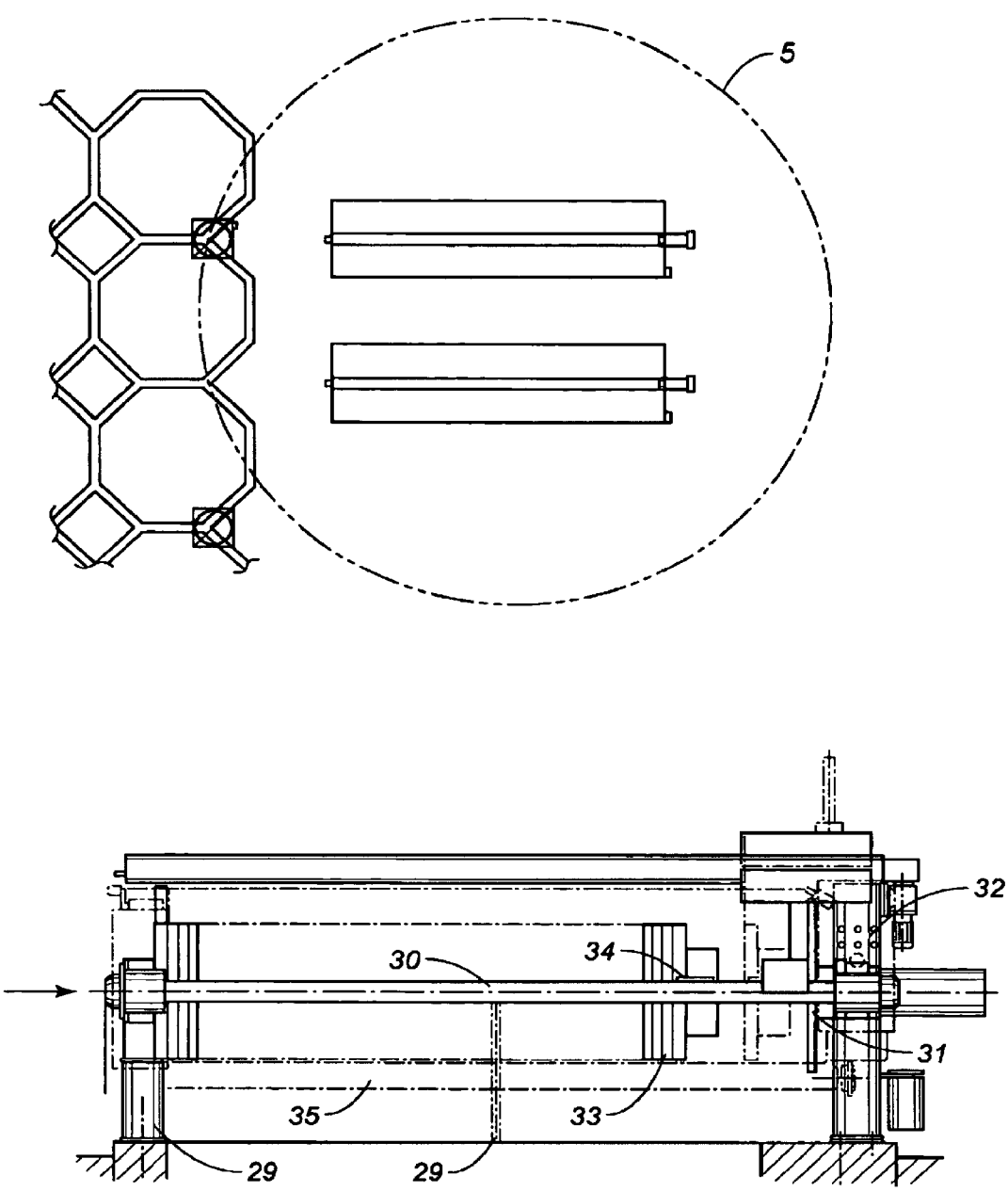
FIG. 3 shows a detailed view and a close-up sectional view of the extrusion press employed in the process of manufacturing tiles & shapes.
Figure 4:
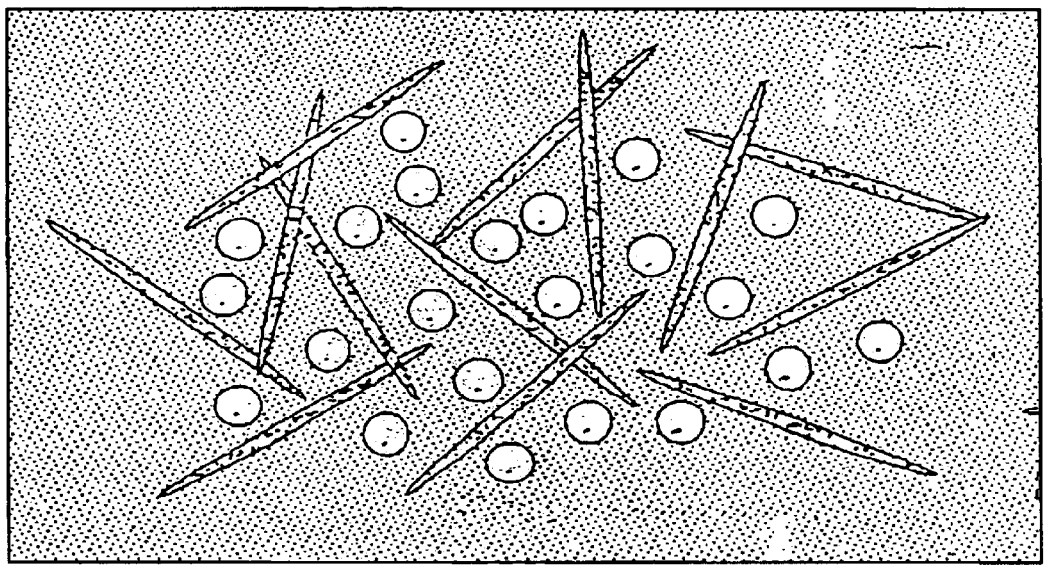
FIG. 4 shows a microscopic view and schematic illustration of conventional process tiles.
Figure 4:
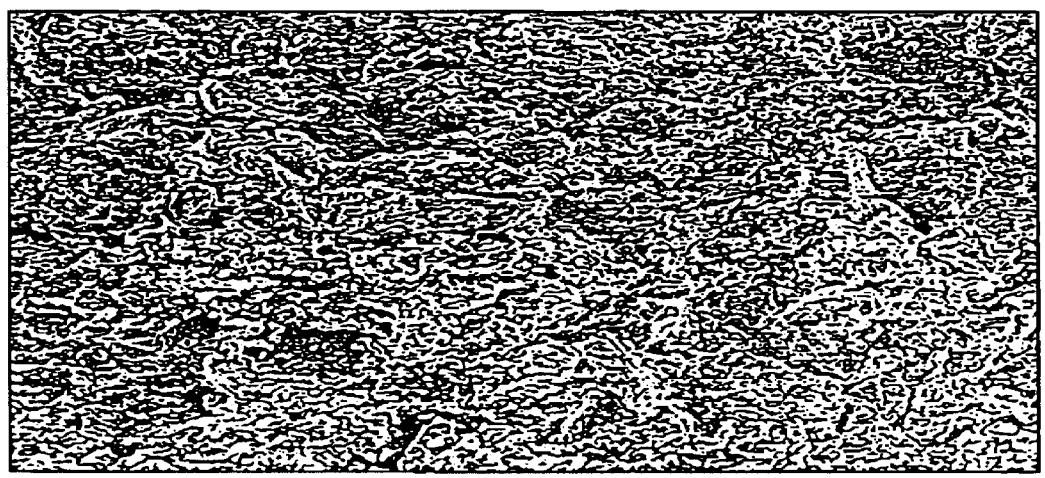

The following raw materials are used in the manufacturing of various flat tiles, shapes and profiles. 1. Ball clays 4. Quartz 10. Red Oxide a. Selected Ball clays 5. Rajampet Clay 11. Chrome Ore b. I Grade Ball Clay 6. Cuddapah Shale 12. Manganese Ore c. II Grade Ball Clay 7. Talc 13. Sodium Silicate 2. China Clays 8. Wollastonite 14. Barium Carbonate 3. Feldspar 9. Iron Ore 15. Soda Ash A superior kind of raw materials are selected and the proportion of each raw material is physically tested for the purity and the quality. The correct proportion of raw materials mix for every batch product is determined in R & D and accordingly the final product is manufactured in the production line. The raw materials are stored in covered silo's (1) in the form of lumps and powder. The plastic clays are stored in longer time for weathering and ageing to get a uniform color. Many raw materials need to have the size of their lumps, particles etc., reduced before they can be used in the process of manufacture. Grinding is often used in general for producing a fine powder.

Body Ball Mills: (2)

The ball mills are lined with high alumina bricks and high alumina balls are used as a grinding media in the mill. The raw materials are weighed on a weighing hopper according to a predetermined ratio and loaded into the ball mills by means of a conveyor and hopper. Then a known quantity of water and a low percentage of deflocculants are added to the dry product in order to allow a better flowing of the slip inside the mill. After grinding the charge of raw materials, a thick slurry called slip is produced.

The grinding process finishes when the particle size distribution of raw materials reaches the required fineness, this being determined through the dry residue found on a screen made up of determined meshes. The slip or slurry is screened on a vibratory screen to remove unground particles and impurities.

Storage Vats: (3)

The storage vats are used to store the slip for ageing. The mechanically driven stirrer has paddle or blades on a impeller/shaft and rotates continuously to prevent sedimentation in slip.

Electromagnetic separator: (4)

The slip is then transferred through an electromagnetic separator to remove iron particles contained in slurry/slip. This is a self- cleaning roller separator with permanent magnets, for the iron removal from slips and liquid products.

This separator is made up of a feeding line which distributes uniformly the product. A magnetic roller with neodymium permanent magnets having a high magnetic field gradient performs a continuous iron removal. The magnetic part of the roller remains always at contact with the product, while an extraction automatic system removes the impurity which has been collected. A secondary roller with permanent magnets forms the automatic cleaning system, which removes the collected impurities from the main roller through a magnet and ejects them through the outlet and stores in a storage vats or tanks through cleaned slurry outlet.

The iron free slip is then transferred by means of an air operated diaphragm pumps and stored in filter press tanks. The slurry is then pumped into a mechanical filter press.

Figure 5:
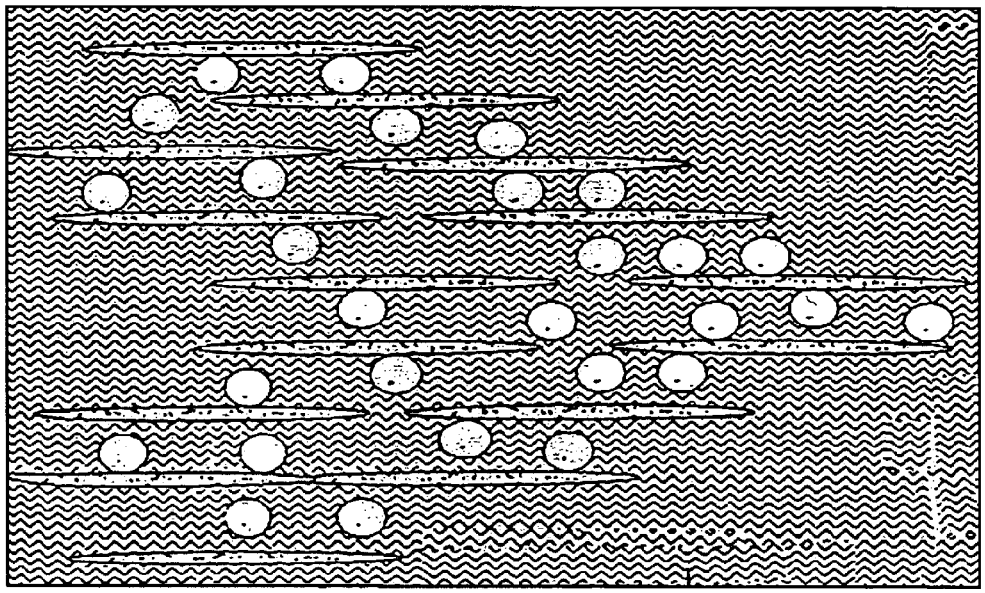
FIG. 5 shows a microscopic view and schematic illustration of process tiles of the present invention.
Figure 5:
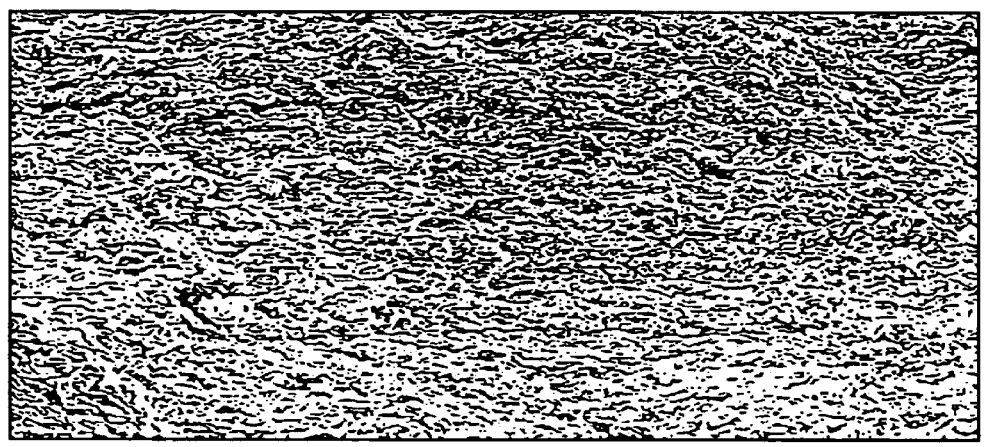

Filter Press : FIG. 5—numerals 29 to 35

The filter press (5) is an intermittent de-watering process. Each filtration cycle comprises of the following steps enumerated herein:

As the filter press is completely empty, the shifting plate, moved by the hydraulic cylinder of the closure, pushes the filter plates together. The filter press plates are made of polypropylene (33) which are supported with legs (29) and with side supporting frames (30). They have an inlet which connects all the chambers and individual outlets. Each plate is covered on both sides with nylon filter cloth. Flange type brass/poly-propylene lock nuts are provided to fix the cloth. These filter presses with (31) electronic light curtain (on one side of the filter press) as safety device for automatic plate shifting device for better working conditions.

The closure builds up a closing pressure which will stand the filtration pressure and make sure that the filter plate stock is closed during filtration. The closing pressure can be self-regulated throughout the filtration. During this short phase, chambers are filled with ceramic slurry for filtration. The method of forcing the slip into the filter press has considerable bearing on the uniformity of the filter cake. Filling time depends on the flow of the feed pump. For slurry having good filterability, it is best that the filter cake forms in the first chambers already before the last ones have been filled.

Once the chambers have been filled, the continuous arrival of slurry to be pressed through the filter cloth provokes rise in pressure, due to the formation of an increasingly thick layer of filtered slurry on the cloths (filter cake). The duration of the filtering process depends on the chamber depth, the filterability of the slurry and the filtration pressure. The dripping water will be collected by filtrate leakage collector (35) and it will be drained out.

The filtration phase can be stopped either manually by a timer or more conveniently by a filtrate flow indicator which issue a stop alarm when the end-filtration rate has been reached.

The shifting plate is drawn back to disengage the first filtration chamber. The cake falls as a result of its own weight. All the filter plates are now separated to allow the cake to drop by automatically with a plate shifting device (34). The total system is connected to electric control panel (32) with programmable logic control for automatic operation.

The discharged filter cakes are collected below the filter press by a belt conveyor. They can be broken on steel wire when falling down and will be continuously discharged by a conveyor system (belt or chain) directly fall onto a wooden pallet or can fall into a cake trolley for further processing. The cake thus obtained will have a residual humidity of about 18–20%.

Circular Mixer (Cake Shredder):

The filter press cakes are transferred to pug mill through circular mixer no.1 (cake shredder) (6) and circular mixer no.2 (9) is connected to extruder no.2 to produce shapes and profiles. The cake shredder has count among the most important material preparation machines with their multiple functions such as mixing and homogening of prepared bodies, blending with scraps, water and steam with breaking up of tabular structure of rolled material before feeding to the extruder.

The shredded material is transferred to the de-airing pug mill. The de-airing pug mill consists of knives set as a screw on one or two rotating shafts moving in a trough. This mill improves the uniformity of a plastic clay body giving it greater workability. The de-airing machine remove air bubbles by evacuation which improves the plasticity.

Extrusion: [FIG. No. 6—numerals 36–42]

A continuous ceramic column and shapes are produced from this machine. An extruder (7) with a feeding hopper (36) and horizontal feeding rollers (37) pug mill with shaft de-airing mixer with mixing paddles (39) to form a combined de-airing extrusion machine. A double body machine having with drop de-airing system. This machine composed of one upper mixer linked to the lower extruding press through the vacuum chamber (38). The upper mixer is always placed perpendicularly to the extruder.

The uniform column advance across the entire width of die precludes undue differences in cross-sectional flow and hence, less texturation coupled with superior strength.

An extruder with rotating spiral auger (40) with auger shaft (41) that greatly facilitate the extrusion of broad, flat columns. An extruder barrel mouth, is able to provide a uniform supply of material to the entire cross section of wide, low dies or broad, flat columns—without causing any unusual vertical deformation.

The uniform supply of material to the die helps equalize the column advance across the full width of the die, thus yielding substantially lower stress levels in the extruded column. That, in turn improves the extruded material's drying and firing properties and, ultimately, the quality of the product. The extruded product has a moisture content (water content) of 16–18% which is ideal for punching (cutting).

Electronic Cutting Machine: (8)

Flat punched tiles are punched from a flat plastic-extruded continuous day column is then cut into a required sizes either using a fixed cutting knives or by performing sequential cutting or punching system. This cutler is fully automatic self-adjustment electronic microprocessor system capable of controlling the required sizes or dimensions.

Cutting edges, with radius or chamfered.

Punching of tiles with lateral and intermediate waste on one belt.

Quick change—over to other sizes

Connection possible to any handling and drying system

Compact and solid design requiring minimum space.

The tension and compression effect on the column is eliminated because the flow rate of the column no longer needs to be critically synchronized with the punching operation.

The cut tiles is sent to the loading system and then transferred to the dryer at a constant density.

The Auger and Mouth of the Extruder:

In order to produce varieties of shapes and profiles the mouthpiece/die (42) are to be fitted to a extruder no.2 (10) before extrusion. The clay column will pass through conveyor to universal cutting machine.

Universal Cutting Machine: (11)

This machine is used to cut different types of shapes and profiles. This is a conventional universal cutting machine.

Drying Process:

The drying is the process where the water or moisture is removed completely before the firing at minimum temperature of 250–300 degrees. The drying cycle is controlled automatically in the various zones of the dryer in order to maintain the pre-determined parameters.

The drying of ceramic products shaped by extrusion or dry pressing has always been characterized by a wide variety of machinery, equipment and methods. It is known that the drying process can be divided into three phases:

A first phase in which shrinkage is directly proportional to the amount of water evaporated and there are no appreciable variations in temperature inside the piece, A second phase in which the reduction in volume continues until the appearance of pores between adjacent particles, and A third phase in which the volume remains practically constant and the number of pores increases in an amount equal to the volume of the residual moisture evaporated.

These phases are clearly shown as a function of time and water content.

Conventional driers can be defined as those based on the use of hot air which operate with minimum cycles of 30 to 40 minutes.

It should be emphasized that this type of drier has been applied almost exclusively in the ceramic floor and wall tile sector for tile pressed with moisture contents of the mix.

In the systems for the production of dry-pressed ceramic floor and wall tile, the field of application of these driers, with drying cycles shorter than 10 minutes, is that of dry-pressed ceramic floor and wall tile with the thickness generally less than one centimeter and heating with infrared radiation. Infrared radiation heats a thin surface layer of the tile, which then accumulates the energy necessary for evaporation through conduction from the outside towards the interior of the tile.

It follows that, for the same conditions, the shape of the piece and its thickness are the parameters which play the most important role in the choice of the type of drying technology to be employed. In the novel process the following driers are used for drying.

Three Layers Horizontal Drier for Flat Products: (12)

The machine is suitable for the rapid drying of ceramic material having humidity at the point of entry of 18 to 20%. It has been specially developed for extruded floor tiles and roofing tiles.

The fast three layer horizontal drier features a totally modular structure which allows each machine to be sized according to the intrinsic technological qualifies of the various ceramic bodies.

A drier made up 3 channels of each modules; these zones are identical yet, from both hygrometry and ventilation air-flow points of view, they are fully independent. Transverse ducts supply and remove drying air. These are equipped with deflectors to direct and evenly distribute the flow parallel to each roller bed. An independent centrifugal fan removes exhausted air (at points conducive to optimum thermodynamic yield) which is then expelled through the chimney. Each zone is equipped with its own hot air generator and fresh air intake. This intake (controlled by an electrical servo) allows quick temperature reduction.

Monitoring of the parameters such as temperature and relative humidity must therefore be exceptionally accurate in the critical sections of the drier. The temperature of process air for two thirds of the drier, varies in function of two signals proportional to the relative humidity at two critical points of the drying curve.

The product to be dried requires particularly refined regulation as well as very good uniformity across the cross section of the drier.

Chamber Drier for Shapes & Profiles: (13)

It is a static type intermittent drier, with 4 separate chambers, which are simultaneously controlled. The sidewalls of each chamber are built in galvanized perforated sheets, through which the air is blown on the cars loading side. A channels set, on the chambers centerline, makes an opposite operation, by sucking the air blown through the walls; the air flows minimum crossing is two trolleys. The connecting piping to the blowing chambers or sucking chambers are made of galvanized sheet, with rock-wool and aluminum coating.

The hot air delivery fan can draw ambient air, hot air coming from a possible kiln or re-circulation air coming from the same drier. An heat generator, even assembled on the hot air delivery piping, always assures the required calories. The drier curve control is got by means of a self-adjuster with programmable curve by ten programmable points.

The doors, four on each drier front part are sliding and retractable type, by laying one upon the other. The trolleys inner positioning is manual. Trolleys inlet and outlet are planned on both parts.

After drying, the product can either pushed to the glazing line or to the kiln by a parallel conveying line(18) for carrying the unglazed tile.

Glaze Ball Mills: (14)

The ball mills are lined with high alumina bricks and high alumina balls are used as a grinding media in the mill. The raw materials are weighed on a weighing machine according to a predetermined ratio are loaded into the ball mills by means of a hopper. Then a known quantity of water and a low percentage of binders are added to the dry product in order to allow a better flowing of the glaze slip inside the mill. After grinding the charge of raw materials, a thick glaze slurry is produced.

The grinding process finishes when the particle size distribution of raw materials reaches the required fineness, this being determined through the dry residue found on a screen made up of determined meshes. The glaze slip is screened on a vibratory screen to remove unground particles and impurities.

Glaze Storage Tanks: (15)

The stainless steel tanks are used to store the glaze slip for mixing. The mechanical driven stirrer has paddles on a shaft and run it in constant movement to prevent sedimentation in glaze slip.

The glaze slip is then transferred through an electromagnetic separator(16) to remove iron particles contained in glaze slip and then is stored in a stainless tanks.

The iron free glaze is then transferred to glaze line for spraying to get a required finishes.

Glaze Process and its Application:

The thin, hard, shiny and usually transparent layer covering a great many ceramic wares has a very important role to play.

Glazes are thin layers of glaze slurry fused on to the surface of the body. They are applied to bodies to make them impervious, mechanically stronger and resistant to scratching chemically more inert and more pleasing to the touch and eye.

Glazes are required to fit bodies of varying chemical and physical natures, they must mature at a variety of temperatures and exhibit specific but various properties when finished, so it is not surprising that there are numberless different glaze compositions, making it very difficult to classify them systematically.

Governing Factors for Glaze Composition:

The method of preparation and application of glazes is one of their determining factors. The constituents are finely ground in aqueous suspension which is then applied to the dry raw or biscuit body. It is therefore necessary that the raw materials put in the mill are water insoluble and this may entail their previous treatment by fritting. The glazed body is next dried, when the glaze must adhere regularly, otherwise crawling may homogeneous without becoming so fluid that it begins to flow off the vertical or inclined portions of the article.

Where the body has not been previously fired, the glaze composition must be such that it matures under the same conditions as the body. Where the body has already been fired to completion it is naturally convenient if the glaze matures at as low a temperature as is compatible with its subsequent use. Unlike a glass, which is made in large tanks which can be stirred and where scum an be removed, the glassy layer that is to become a glaze must become homogeneous without any mechanical aid. It is therefore very important that the raw materials, should be of known composition and should not introduce any matter that will not become part of the vitreous phase. The first essential is to make a mixture that will fuse to a homogeneous, viscous glass at a desired temperature.

During and after fusion the glaze components react with the body surface to form a bonding intermediate layer. Proper interaction is very important and it depends not only on the total composition of the glaze but also on the individual compounds used to introduce the constituent oxides. The glaze batch must be made so that the right amount of interaction with the body occurs.

On cooling, the fired glaze body contracts and if the coefficients of expansion of the glaze and body are not sufficiently close together stresses and strains will be set up resulting in 'peeling', or even 'dunting'. The coefficients of expansion of body and glaze must be mutually compatible. The finished glaze must be hard, smooth and glossy. This is not only for the visual effect; a smooth surface is more resistant to chemical and physical attack. It is less likely to fracture. By applying a glaze of slightly lower coefficient of expansion that of the body the cooled glaze is brought into slight compression and the mechanical strength of the piece improved.

Visually a transparent, colourless, brilliant glaze may not always be desirable. A discoloured body can be made to appear white by application of a white opaque glaze. Further, matt glazes with a wax like surface, crystalline glazes with a few large crystals, and numberless coloured glazes can be made. The glaze composition must be adjusted to give individual chemical, mechanical and optical properties.

There are two different kinds of glaze lines for the application of flat products, shapes and profiles.

Glaze Application Line 1: (17)

This line is used to apply for flat products.

Glaze Application Line 2: (19)

This line is used to apply for shapes and profiles.

The Application of Under-glaze, In-glaze or On-glaze Coloured Designs:

The diversity of physical and chemical properties of ceramic colourants together with the variety of surfaces and shapes to be used has led to a very wide selection of methods of applying the colored designs.

Direct Application of Design:

Various means can be used for the ultimate designs to be produced directly on the ware, hand painting, crayoning, spraying, banding and lining, ground laying.

Semi-Direct Application of Design:

The design is prepared in a permanent form which is used to apply the colourant to the ware, stamping, stenciling, screen printing.

Indirect Application of Design:

The design and colourant are produced on a thin sheet of paper from which A is transferred to the ware; offset; paper transfers; intaglio printing or engraving, lithography, screen printing.

Internal Comers, External Comer, Kitchen Platforms, Staircase ties with nosing, Exterior Cladding Tiles can be made by glaze or unglaze techniques.

This in turn means that the glaze can be applied in either a liquid or in solid form (i.e. as slip or as powder) onto the wet or the dried tiles.

On top of that any other variations are also possible, e.g. powder can be introduced into the wet glaze in order to obtain special effects. Moreover, the surface of the wet tiles can be treated after punching by means of brush rolls etc. so that totally individually designed wall and floor coverings can be produced.

Inhomogeneous Glazes:

Homogeneous Glazes with only one vitreous phase transparent. Matt and crystal glazes are only used where their special attractive appearance is on show. e.g. sanitary ware.

Opaque Glazes:

A vitreous phase is rendered opaque if the path of light is suitably broken up and made diffuse. The opacity of the glaze is thus determined by the vitreous phase and the disperse phase and by the particle size. Opacity increases as the difference in the refractive index of the vitreous and the disperse phases becomes larger.

The method of formation from a homogeneous melt makes the particles much smaller, evidently approaching the optimum size for opacity.

Zinc oxide plays a remarkable role in all glazes and can also produce opacity. It is particularly useful in increasing the effect obtained with any single opacifier.

Matt Glazes:

Matt glazes differ from transparent glossy glazes. They are formed when a completely fused glaze cools and part of it crystallizes out. The crystals must be so minute and regularly dispersed that the surface of the glaze is smooth and velvety to touch. It should be possible to write on a matt glaze with an ordinary pencil and then to rub the mark off with the finger.

The crystals in a matt glaze break up light rays making the glaze more or less opaque. Of course, opaque glazes can be made matt as well. The same components with occasional minor additions are used to make matt glazes are used for glossy ones.

Crystalline Glazes:

The use of crystalline glazes is confined to artistic purposes. They have sizeable shapely crystals set in a vitreous matrix which may be a different colour, and by careful work can be made to look very beautiful.

These large crystals are produced when a glaze that is supersaturated with a compound that crystallises easily is cooled very slowly. As the thickness of the glaze restricts growth in one dimension to about 0.5 mm only those substances whose crystals grow in two dimensions only will give good crystalline glazes. Zinc oxide gives large crystals in certain areas as though the crystallising substance had segregated. Titania produces small but evenly distributed crystals. Colouring agents are usually taken up preferentially by the crystals or the vitreous phase and so can produce very fine effects.

Single Layer Fast Roller Kiln: (20) and (21)

A single layer fast roller kiln is used for firing the product. The kiln is designed to withstand a firing temperature up to 1250 deg. C. with slow cooling curve depending on the thickness of the product. The flexibility of the firing cycles range from 90 to 360 minutes.

A computerized system controls the instrumentation and regulates the firing curve. The process parameter is performed automatically according to the type of material and firing cycle. The roller kiln guarantees a very high output and constant quality of the fired product.

The result achieved brings the world of novel extruded products for the market.

Although the plant is certainly innovative for this kind of product, it does have much in common with the most modem ceramic file factories since many of the machines used are well-known in the pressed tile sector.

Monofusion is a completely new process in the company's ongoing search for new techniques, this process of natural monofusion has been developed. The surface of the file is treated over a wide variation of temperatures during the firing process.

The basic concept of glazing thus disappears and is replaced by the surface application of natural products which integrate with the upper layers of clay and react during firing to create a mixture of vitreous and crystalline phases at high temperatures.

The finished result is a new product with the following properties:

Different, more natural appearance

Mohs Scale 8

Water Absorption: <0.5%

Resistance to freezing and hard climatic conditions.

Driving System

The Loading Sucker Machine and Unloading Sucker Machine(22) are stacking devices with suction cup basement group with horizontal and vertical combined movement for catching and laying the pre-arranged tiles to a steel container. Kiln loading and unloading machines are for handling the product at both ends of the Kiln for handling the product feeding and governing the operation of the kiln exit, aligner and emergency collecting device at the kiln.

Sizing & Chamfering: (23)

The squaring and chamfering machine used mostly for the sizing of the product. This differentiates form the standard squaring machine because it has 4 motor drive belts with a stiff holding of the material during all machining steps. The remarkable sizing/removal of material can thus be made with a perfect squareness of the four sides with chamfering.

The squaring-chamfering machine uses mostly the transport and size adjustment systems used on large scale production lines. It uses a reduced number of spindles and extremely simple placing system, orthogonal to the tile advancing axes. The picture beside enhances the system to position, introduce and accompany that title perfectly orthogonal into the second sizing section, so that to obtain a very accurate squaring of the same tiles.

Properties of Extruded Tiles and Shapes

The extruded tiles possess the following superior qualities:

| | |
|---|---|
| a. Water absorption: | <0.5% |
| b. Scratch hardness (Moh's scale) | |
|    i) Glazed tiles: | 6–7 |
|    ii) Unglazed Tiles: | 7–8 |
| c. Resistance to staining: | Resistant |
| d. Resistance to Acid: | Resistant |
| e. Resistance to Alkalies: | Resistant |
| f. Slip Resistance: | 19°–27° |

-continued

| g. Frost Resistance: | Resistant |
|---|---|
| h. Density: | 2.2–2.3 gm./cc. |

It should be noted that the fully vitrified extruded ties of the above properties do not limit the scope of the invention.

Liner & Planner:

The liner is an electronic unit for detecting dimensional defects in ceramic ties. This control device classifies the ceramic tiles according to size and quality classes, shape defects and evenness defects.

This system is able to re-fashion a metric reference suited to the file. Size control is performed on an analytic basis by a calculation program, and calculates the lengths of the sections determining both size classification and shape defect classification.

The planner is an electronic unit for checking the planarity of ceramic tiles without the need of any physical contact.

The evenness control is performed by a data processing based on the calculation of an ideal surface. The sensors detect the surfaces while the tiles are running by using a scanning which can be set with the help of a software.

The points thus detected are then processed by a calculation algorithm which allows you to obtain the equation of the surface mathematically. This will be the basis for calculating shape defects. Since this surface depends entirely on the shape of the file, the measurement of the defects too will depend only on the shape of the surface and not on that of the conveyor.

Sorting & Packing: (24)

The sorting bench counter is where the operator looks at and classifies the product. It can be either single-row or double-row for two operators facing each other. The tiles run next to each other along a floodlit surface which brings out defects and shades. Using a fluorescent felt pen, the operator marks the tile in certain places which correspond to the chosen sorting. A photocell and encoder reading system, situated on the downstream stretch, decodes this sign deciding the code of the product and its assignment to the stacking device. The double-row counter accepts sizes up to 330×330 in double-row.

Sorting bench closed, air-conditioned and protected from outside disturbance, ensures maximum concentration.

The tiles are sorted, stacked and conveyed to the packaging system. The tiles are held down on their edges by a pair of elastically counter-acting belts. At the designated stacking device, a pair of cylinders perform the extraction, building the stack downwards. The stacking devices are moved by motors which allow for accurate and constant descent once the thickness of the tile has been set. This way, during stacking there is an accompanying movement without any impact and with a very low noise level. The stack once completed is laid down on a chain conveyor which takes it to the packaging system.

The automatic wrap-around packaging device uses flat blank cartons. The cartons are picked up from a double store and wound perimetrally around the stack. Sealing is by hot melt adhesive or by cold vinyl glue. The out-coming packages are moved by a belt conveyor with an inkjet printing head on it to mark the boxes according to their code.

The electrical control system is placed inside a panel mechanically fastened onto the machine, and controls every function involving the sorting counter, stacking and packaging. The management is entrusted to an operator interface based on an industrial P.C.

The carton top introducer device introduces a slip of carton onto the stacks at the inlet of the wrap-around, in order to close the top part of the package, covering the glazed surface of the tiles.

The stack divider is integrated with the machine body and positioned at the output of the stacking unit. Its task is that of subdividing a stack containing twice or three times as many tiles as will be contained in the package. This allows to send two or more consecutive stacks of the same sorting to the wrap-around, so that the packages may be paired. The package pairing device is used to automatically palletize large-size packages containing a limited number of tiles, thus reducing the supporting surface. This device superimposes or straps two or more packages of the same code and glues them together. The group of packages thus made can be palletized safely since they are steadier than an individual package. The packages can then be separated on the yard during laying. The package pairing device can be used only if the stack divider too has been installed on the line.

Palletizing: (25)

The palletizer is an entirely programmable Cartesian robot, with a stanchion structure and a track on the ground. The gripper is pneumatically controlled, whereas its rotation is controlled by a gear motor. The motorization of the 3 Cartesian axes and the rotation of the gripper are controlled by inverters; the machine is managed by a commercial P.L.C. 20 different sizes can be stored at the same time.

The unit consists of a store with a pile of pallets from which the palletizer, provided with a special gripper, automatically picks up a pallet and positions it in the station which has been left empty. The same device can pick up carton sheets from a special store and slip them in between several layers of packages to improve their steadiness.

The double gripper is an optional device for the palletizer which allows you to pick up and move No.2 packages at the same time even when their codes differ. The positioning of the package on the pallet can be differentiated according to the various combinations which may appear.

The Manual Line (26) for sizes with higher thickness to be used as stand-by at the semiautomatic sorting line, with shunter suitable to divide the manual like and the semi-automatic one.

The packed products are then palletized with shrink pack by polythene sheets with gas-operated pistols and made ready for dispatch.

Sawing & Gluing Machine: (28)

The sawing machine is used for cutting the tiles into smaller sizes to make patterns and for border tiles.

The cut pieces are glued in a gluing machine on crosswise reinforced nylon net backing with vinyl glue. The pantograph sides interconnected by cross members with paper guide rollers, cutters, paper guides, glue tray with device for glue tank rapid release and glue level indicator with regulator. The motor driven rubber coated roller for collection of paper already spread with glue also fitted in the machine.

The glued materials will be sent through a dryer where tiles are get bond with the nylon net paper. It is fitted with electric ventilator for hot air suction and re-emission on the product to dry it.

The glued materials are picked up and deposited into boxes for ready to use. The small cut pieces can also be glued as panels for ceramic carpets & borders.

The feather machine (27) is used to rectify all shapes and profiles by using abrasive wheels.

The salient features of the invented technology with respect to conventional technologies are explained in the following description.

| CONVENTIONAL TECHNOLOGY | NOVEL TECHNOLOGY |
|---|---|
| Creation of granules on the surface of the tiles is microscopically having regular Undulation leading to lack of smooth surface. | Creation of molecules instead of granules. |
| The slip is dried in spray drier | The slip is semi-dried in filter press |
| The granules are obtained on evaporation of water from the slip | Water is removed by compression in mechanical filter press |
| Moisture content of spray dried granules will be 5 to 6% | Moisture content of filter press cake is 18 to 20% |
| Dry process by hydraulic press is due to low moisture in granules | Wet process by extrusion is due to high moisture content in filter cakes |
| Production change over time is very high due to change of the die for each and every size | Production change over time is very low due to simple changing of the mouth piece. |
| Any shapes and profiles cannot be made in conventional process. | Any type of shapes and profiles can be made only in this novel process. |
| Recycling of green waste is not possible & material has to pass through all the process stages. | Recycling of green waste is possible immediately. |
| Dry strength is low due to scattered fragments during the process of pressing. | Dry strength is very high due to compact surface during the process of extrusion. |
| Due to technology limitation in this process production of shapes, profiles not possible. | No limitation in producing any shapes and profiles due to high moisture in the body. |
| Due to technology limitation in this process granulometric surface on the tiles will leads to roughness, staining and dust attraction. | Extrusion technology will have molecular surface resulting all pores are covered which gives smooth surface & no attraction of dust and stains. |
| Difficult to make tiles with very high thickness in this technology. | Tiles may be made of any thickness and shapes. |
| Grooves in the backside of ties cannot provide anchoring effect due to limitation in the process. | Any type of grooves may be made for better anchoring effect to hold the tiles on the walls / elevation. |

We claim:

1. A process for manufacturing fully vitrified flat extruded ceramic glazed or unglazed tiles and profiles comprising:
   mixing of raw materials together in predetermined ratios;
   wet milling the mixed raw materials in ball mills;
   mechanically filter pressing the wet milled raw materials to form cakes;
   shredding said cakes so as to form noodle-shaped structures;
   de-airing the noodle-shaped structures by a pug mill machine to proper mix a clay body;
   drawing the clay body as a column through a die so as to form a desired shape;
   drying the desired shape of the clay body in a three-layer horizontal drier and in a chamber drier;
   coloring the dried clay body in a glazing line;
   firing the colored dried clay body in a roller kiln;
   sawing the fired clay body into a desired size and shape in a sawing and glueing machine;
   sorting the sawed body into a desired grouping;
   packing the grouping of the bodies; and
   palletizing the packed grouping of bodies.

2. The process of claim 1, said raw materials being of different types of clay.

3. A system for manufacturing fully vitrified flat extruded ceramic titles of a desired shape comprising:
   a ball mill means for grinding raw material to a required specification;
   a conveyer means cooperative with said ball mill means for feeding the raw material along with water as a slurry;
   a weighing hopper means cooperative with said conveyer means for weighing the raw material and water prior to passing to s aid ball mill means;
   a magnetic separator means connected to said ball mill means for separating iron particles from the slurry;
   a vat means connected to said ball mill means, said vat means for constantly moving the slurry so as to prevent sedimentation;
   a mechanical filter press means connected to said vat means for obtaining a filter cake of clay;
   a cake shredder means connected to said filter press means for shredding the filter cake into a noodle-shape;
   a moister regulator means cooperative with said cake shredder means for controlling an amount of moisture of the noodle-shape;
   a de-airing pug mill means connected to said cake shredder means for removing air bubbles from the noodle-shape by evacuation so as to control a workability or elasticity of the clay of the noodle-shape;
   an extruder means connected to said de-air pug mill means, said extruder means having a pair of dies for drawing the clay of noodle-shape into a clay column;
   a cutting means connected to said extruder means for cutting the clay column into required sizes by a punching system;
   a three-layer horizontal drier means connected to said cutting means for drying flat products from the cut clay column into a constant density;
   a chamber drier means connected to said cutting means for drying shapes and profiles of the cut clay columns;
   a glazing line means connected to said three-layer horizontal drier means and said chamber drier means for glazing the flat products and the shapes and profiles;
   a conveyor line means connected to said three-layer horizontal drier means and said chamber drier means for passing unglazed tiles to a kiln;
   a single layer fast roller kiln means connected to said glazing line means and said conveyor line means for firing the glazed flat products and shapes and profiles and for firing the unglazed tiles;
   a squaring and chamfering means connected to said fast roller kiln means for forming a rectangularity of tiles;
   a slide adjustment and feather means cooperative with said squaring and chamfering means for cleaning sides of the shapes and profiles of tiles;
   a sorting conveyor means cooperative with said squaring and chamfering means for sorting the shapes and profiles of tiles in order to palletize the sorted shapes and profiles of tiles;
   a liner and planner means connected to said sorting converyor means for checking dimensional defects and planarity of the shapes and profiles of tiles; and
   a saw and gluing means cooperative with said fast roller kiln means for forming border tiles and square pieces.

4. The system of claim 3, said ball mill means having an alumina lining and an alumina grinding media therein.

5. The system of claim 3, said filter press means for removing moisture from the filter cake of clay.

6. The system of claim 3, said extruder means adaptable for receiving different types of the pair of dies.

7. The system of claim 3, said cutting means being an electronic cutting line suitable for cutting the clay column into flat products.

8. The system of claim 3, said cutting means being a universal cutting machine suitable for cutting the clay column into different kinds of shapes and profiles.

9. The system of claim 3, said three-layer horizontal drier means being a three-layer horizontal drier for drying different thicknesses of flat tiles.

10. The system of claim 3, said chamber drier means being a chamber drier for drying different kinds of shapes and profiles.

11. The system of claim 3, said glazing line means being a pair of glazing lines for glazing flat tiles with different natural and glaze color applications to give different surface finishes.

12. The system of claim 3, each of said pair of glazing lines having different pieces of equipment.

13. The system of claim 3, further comprising:

an auxiliary kiln means connected to said glazing line means and said conveyor line means for providing a firing cycle that is longer than a firing cycle of said fast roller kiln means.

\* \* \* \* \*